United States Patent [19]

Tomozawa

[11] 4,182,194

[45] Jan. 8, 1980

[54] FREE WHEEL HUB WITH COASTER BRAKE

[76] Inventor: Yoshiaki Tomozawa, No. 9-25, 1-chome, Kohamanishi, Suminoe-ku Osaka, Japan

[21] Appl. No.: 884,758

[22] Filed: Mar. 9, 1978

[30] Foreign Application Priority Data

Mar. 11, 1977 [JP] Japan .................. 52-29896[U]

[51] Int. Cl.² ............................ G01F 3/24; G01F 3/28
[52] U.S. Cl. .................................. 74/217 B; 188/26; 192/6 R; 192/6 B
[58] Field of Search ........................ 188/26; 74/217 B; 192/6 R, 6 A, 6 B

[56] References Cited

U.S. PATENT DOCUMENTS

| | | | |
|---|---|---|---|
| 959,509 | 5/1910 | Glover | 192/6 R |
| 1,504,210 | 8/1924 | Bush | 192/6 B |
| 1,526,383 | 2/1925 | Simmons | 192/6 B |
| 2,113,177 | 4/1938 | Glacy | 192/6 B |
| 2,972,908 | 2/1961 | Hood et al. | 192/6 A X |
| 3,135,368 | 6/1964 | Shimano | 192/6 A |
| 3,293,946 | 12/1966 | Gleasman | 192/6 A |
| 3,351,165 | 11/1967 | Shimano | 192/6 A |
| 3,506,100 | 4/1970 | Tomozawa | 192/6 A |
| 3,650,363 | 3/1972 | Cristie | 192/6 A |
| 3,870,134 | 3/1975 | Anthamatten | 192/6 A |
| 3,892,301 | 7/1975 | Frei et al. | 192/6 A |
| 3,942,615 | 3/1976 | Craig | 192/6 A |

*Primary Examiner*—Leslie Braun

[57] ABSTRACT

A multi-speed free wheel hub with a coaster brake for use in a bicycle comprising a driving mechanism for driving the bicycle and a braking mechanism for braking the bicycle. Both the driving and braking mechanisms are independent of each other when one pedals the bicycle. A driving female screw cylinder is incorporated into the driving mechanism to achieve the complete driving and braking modes of operation.

3 Claims, 5 Drawing Figures

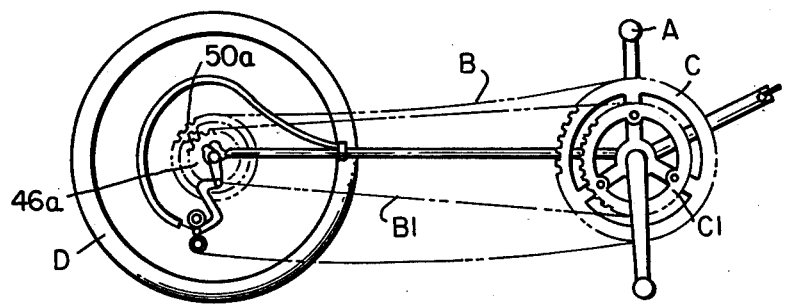
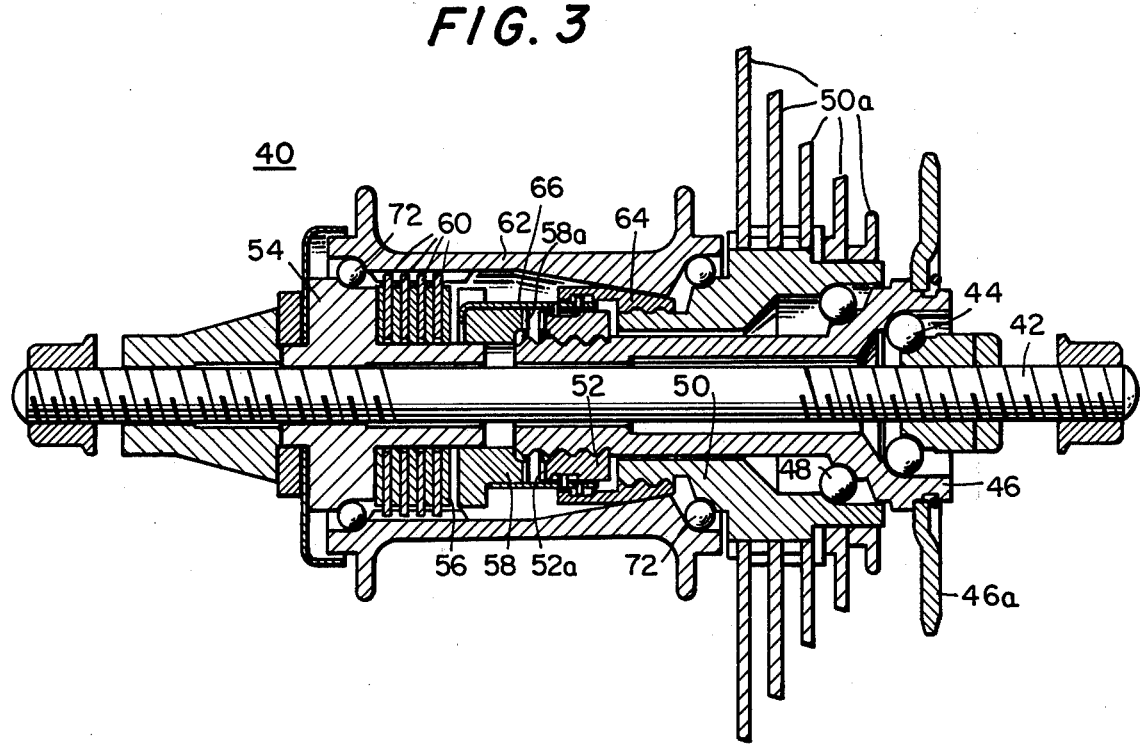

FREE WHEEL HUB WITH COASTER BRAKE

BACKGROUND OF THE INVENTION

1. Field of the Invention

This invention relates to a free-wheel hub with a coaster brake for use in a bicycle.

2. Description of the Prior Art

One type of the free-wheel hub with a coaster brake to which the present invention pertains is disclosed in Japanese Utility Model Publication No. 44-5464 published on Feb. 27, 1969 with the same assignee as the present invention. The free-wheel hub disclosed therein is illustrated in FIGS. 1 and 2, from which it is seen that the free-wheel hub 10 with a coaster brake is employed in the rear wheel D of the bicycle in FIG. 1, in which a selected one stand of a multistand driving change gear 12 is driven by pedalling a pedal A clockwise through an endless driving chain B spanned across a front driving gear C and the driving change gear 12 while a braking gear 14 is rotated by pedalling the pedal A counterclockwise through an endless braking chain B1 spanned across a front braking gear C1 and the braking gear 14. The driving force from the driving change gear 12 is transmitted to a hub cylinder 16 through a ratchet 18 and bearings 20 to drive the rear wheel D incorporating the hub cylinder 16, which results in running the bicycle forward. On the other hand, during the braking mode operation, the braking gear 14 mounted on a braking male screw cylinder 22 permits a braking female screw cylinder 24 thread engaged to the braking male screw cylinder 22 to shift axially leftward as viewed in FIG. 2. The braking female screw cylinder 24 pushes a clutch 26 through a clutch spring 28 toward brake discs 29 sandwiching rotary discs 30 rotatably free from a brake holder 32 fixed to a shaft 34. The rotary discs 30 are accordingly pressed by the clutch 26 while the rotary discs 30 are being rotated with the hub cylinder 16 through the grooves provided on the inside wall of the hub cylinder 16, so that the brake discs 29 are subjected to the braking force from the clutch 26, resulting in braking the rear wheel D of the bicycle.

The conventional coaster brake is constructed such that the following disadvantage is inevitable. Namely, when one pushes the bicycle backward without riding thereon, the rear wheel D of the bicycle is rotated counterclockwise in FIG. 1 thereby naturally rotating the hub cylinder 16 in the same rotating direction. At this time the adaption of the ratchet 18 to the engagement between the driving change gear 12 and the hub cylinder 16 causes the driving change gear 12 to rotate in the same rotating direction as the hub cylinder 16. Then the driving change gear 12 rotates the front gear C together with the front gear C1 through the driving chain B and therefore the braking chain B1 due to the front gear C1 rotating the braking gear 14, whereby the braking mode operation is carried out in the same way as above described, resulting in braking the bicycle. Thus the conventional bicycle employing such a coaster brake experiences this difficulty in pushing it backward.

SUMMARY OF THE INVENTION

Accordingly, an object of the present invention is to provide a multi-speed free-wheel hub with a coaster brake incorporated therein that is reliable in both the driving and braking modes of operation.

Another object of the present invention is to provide a multi-speed free-wheel hub with a coaster brake which allows reverse rotation of the hub drum.

With the above objects in view, a free-wheel hub with a coaster brake of the present invention comprises an axle mountable to the frame of a bicycle and a brake cylinder rotatably mounted on the axle. The brake cylinder has a brake chain sprocket on which a brake chain is placed and a thread formed on its outer surface. A drive cylinder having a set of speed change sprockets which are driven by a driving chain and a thread on its outer surface is rotatably mounted on the brake cylinder. A hub drum to which spokes of the rear wheel are attached is rotatably supported on the drive cylinder at one end and on the axle at the other end. The hub drum has a conical inner surface which preferably is a friction surface. The hub drum has on its inner surface a plurality of friction discs that are axially movable but not rotatable with respect to the hub drum. Between these friction discs are inserted friction discs that are movable in the axial direction but immovable in the circumferential direction with respect to the stationary axle. This friction disc brake mechanism between the axle and the hub drum is operated by a first clutch member that is axially moved to move the brake mechanism to its brake position when a second clutch member thread fitted over the thread of the brake cylinder and axially movable to engage and disengage with the first clutch member is moved toward the first clutch member. Between the hub drum and the drive cylinder is disposed a drive cone thread fitted on the thread of the drive cylinder. The drive cone has a conical outer surface that is friction-engageable with the conical inner surface formed on the hub drum. When the drive cylinder rotates in one direction, the drive cone moves to engage the hub drum and the drive cylinder, and when it rotates in the other direction, the drive cone moves in the opposite direction to release the engagement between the hub drum and the drive cylinder. Spring means is disposed between the drive cone and the second clutch member in a friction contact relationship to transmit a predetermined rotating force therebetween.

BRIEF DESCRIPTION OF THE DRAWINGS

The present invention will become more readily apparent from the following detailed description of the preferred embodiment with reference to the accompanying drawings in which;

FIG. 1 is a side view of a part of a bicycle employing a coaster brake;

FIG. 3 is a cross sectional view of a free-wheel hub with a coaster brake in accordance with the present invention;

DESCRIPTION OF THE PREFERRED EMBODIMENT

Figure 2:
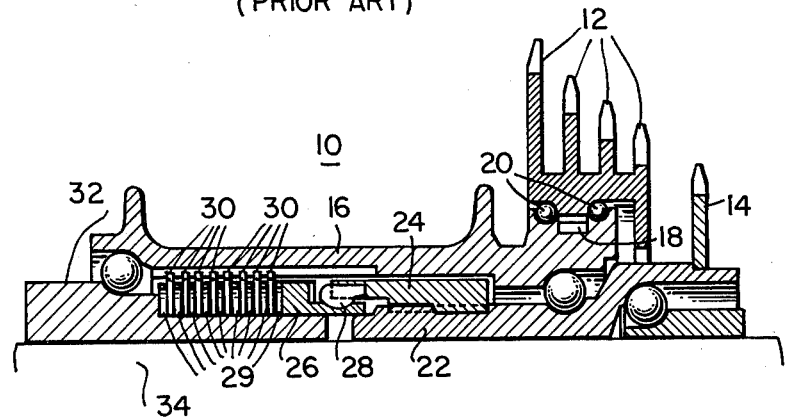
FIG. 2 is a cross sectional view of a free-wheel hub with a coaster brake in accordance with the prior art.
Figure 4:
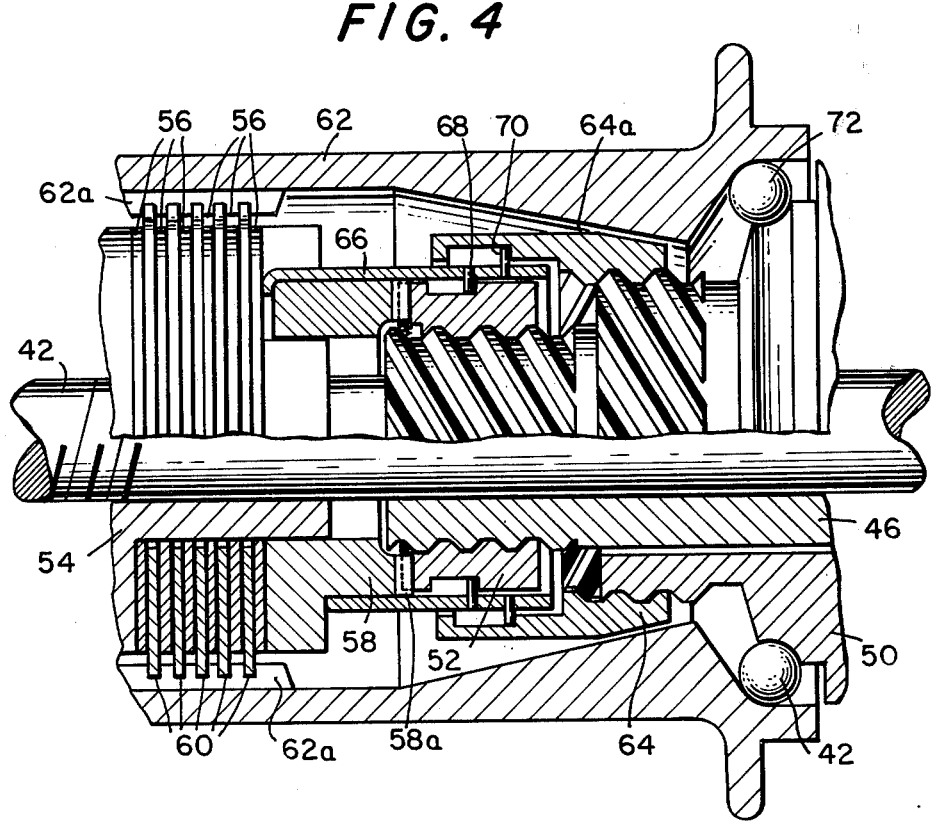
FIG. 4 is an enlarged cross sectional view of a part of the free-wheel hub with a coaster brake in accordance with the present invention in a driving position.
Figure 5:
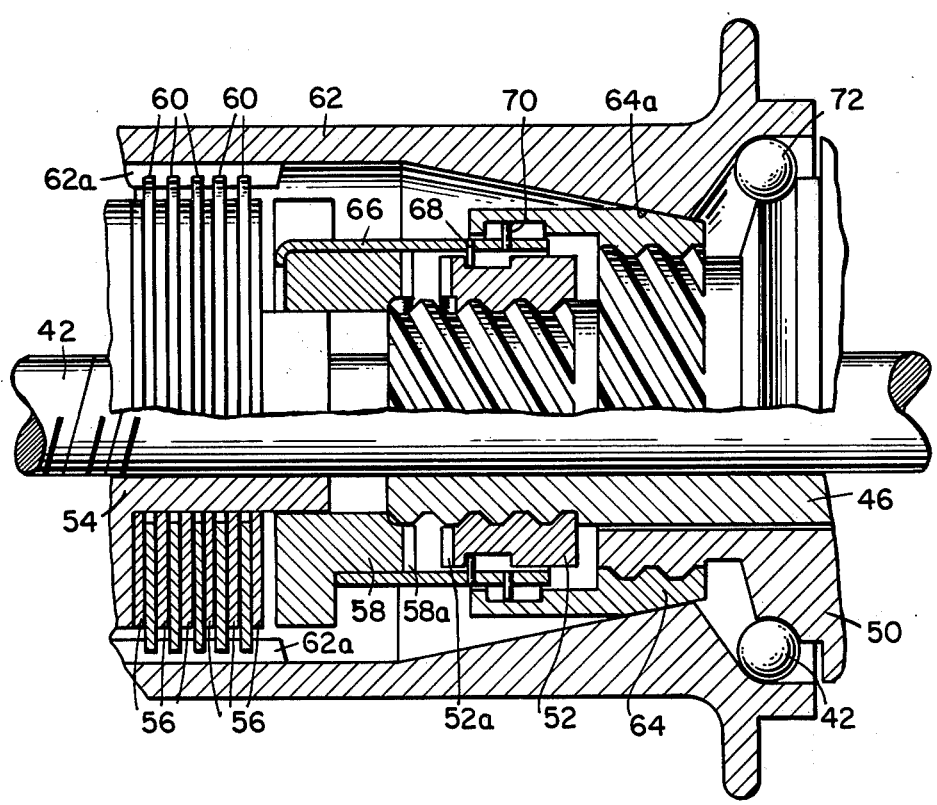
FIG. 5 is an enlarged cross sectional view of a part of the free-wheel hub with a coaster brake in accordance with the present invention in a braking position.

Referring now to FIGS. 3 to 5, there is shown a freewheel hub with a coaster brake of the present invention generally designated by the reference numeral 40. The free-wheel hub 40 includes an axle 42 inserted through bearings 44 into a braking male screw hollow cylinder 46 which is in turn inserted through bearings 48 into a driving male screw hollow cylinder 50. The braking and driving male screw cylinders 46 and 50 rotate in opposite directions independent of each other according to the alternate pedalling direction of the bicycle as partly shown in FIG. 1.

The braking male screw cylinder 46 has a braking gear 46a fixed to the enlarged portion of the axially outside end thereof and the driving male screw cylinder 50 has a multistand change gear 50a fixed to the enlarged portion of the axially outside end thereof. The braking male screw cylinder 46 has a male screw threaded on the periphery of the axially inside end portion thereof to form a thread-engagement with a braking female screw cylinder 52.

The shaft 42 has a brake disc holder 54 secured thereto on the opposite side from the braking male screw cylinder 46, and the brake disc holder 54 has several brake discs 56 fixed to the periphery of the axially inside thinner portion thereof. Furthermore, the brake disc holder 54, in the inside thinner portion thereof, fits in a clutch 58 which is slidable between the brake discs 56 fixed to the brake disc holder 54 and the braking male screw cylinder in the length direction of the shaft 42 as shown in FIG. 3. The inside end face of the clutch 58 is provided with a saw blade 58a to clutch the braking female screw cylinder 52 similarly having a saw blade 52a provided on the opposite face to the clutch 58.

Between respective brake discs 56 are provided rotary discs 60 each of which is freely rotatable in relation to the brake disc holder 54. As shown in detail in FIGS. 4 and 5, claws provided on the respective edges of the rotary discs 60 engages the grooves of the internal wall 60a of a hub cylinder 62 providing rotation through bearings 72 on and between the brake disc holder 54 and the driving male screw cylinder 50, and therefore the rotary discs 60 are rotated with the hub cylinder 62.

On the other hand, the driving male screw cylinder 50 also has a male screw threaded on the periphery of the axially inside end portion thereof to form a thread-engagement with a driving female screw cylinder 64 which has a tapered portion gradually decreasing in diameter toward the outside of the shaft 42, the surface of the taper being provided with corrugated teeth 64a, not shown but indicated in FIGS. 4 and 5. Also the hub cylinder 62 has a taper, formed in the internal wall thereof, corresponding in gradient to the taper of the driving female screw cylinder 64 to be clutched.

The coaster brake 40 further includes a clutch spring 66 which has an axial gap, not shown, for forming a spring and whose one end is fixed to the outside of the clutch 58 to cover it, a braking spring 68 tightly contacting the groove formed in the outside surface of the braking female screw cylinder 52 and having both terminals inserted into the openings provided on the corresponding end of the clutch spring 66, and a driving spring 70 tightly contacting the groove formed in the inside surface corresponding to the outside surface other than the tapered portion of the driving female screw cylinder 64 and having both terminals inserted into the other openings provided on the corresponding end of the clutch spring 66.

Hereinafter will be described the modes of operation of the coaster brake 40.

In the same manner as in FIG. 1 and the description of the prior art, it is also a practice applied to the present invention to perform the driving function by pedalling the pedal A clockwise as viewed in FIG. 1 through the driving chain B spanned across the front driving gear C and a selected one stand of the multistand driving change gear 50a in the rear wheel D, and to perform the braking function by pedalling the pedal A counterclockwise through the braking chain B1 spanned across the front braking gear C1 and the braking gear 46a in the rear wheel D.

In FIG. 1, when one pedals clockwise as the driving mode of operation, the change gear 50a is rotated clockwise as above described thereby rotating the driving male screw cylinder 50 thread-engaged to the driving female screw cylinder 64. Accordingly, the driving female screw cylinder 64 is axially shifted rightward as viewed in FIG. 1 because the driving male screw cylinder 50 can not be shifted, and then the tapered portion provided with the corrugated teeth 64a of the driving female screw cylinder 64 clutches the tapered portion of the internal wall of the hub cylinder 62 as clearly shown in FIG. 4. Thus the torque of the change gear 50a is transmitted to the hub cylinder 62, resulting in driving the bicycle through the pedal A, the change gear 50a, and the chain B because the hub cylinder 62 forms a part of the rear wheel D of the bicycle.

Also the tapered portion of the driving female screw cylinder 64 without the corrugated teeth 64a may clutch the tapered portion of the hub cylinder 62 directly and in turn drive the bicycle.

On the other hand, when one pedals counterclockwise in FIG. 1 as the braking mode of operation, the pedal A, the front gear C, the driving chain B, the change gear 50a, and the driving male screw cylinder 50 are all rotated counterclockwise, that is the opposite rotating direction to that in the driving mode of operation, thereby gradually shifting leftward the driving female cylinder 64 from the position shown in FIG. 4 and consequently detaching the tapered portion of the driving female screw cylinder 64 from the hub cylinder 32 as shown in FIG. 5. At this time the driving mode of operation is disengaged. In this case, because the driving male screw cylinder can not be shifted, the driving female screw cylinder 64 is shifted leftward without any impediment and without running idle because of the presence of the driving spring 70.

At the same time, when one pedals counterclockwise and the driving mode of operation changes to the braking mode of operation, as the second braking mode of operation, the braking gear 46a a rotated through the pedal A, the front gear C1, and the braking chain B1 as above described together with the braking male screw cylinder 46. The braking female screw cylinder 52 thread-engaged to the braking male screw cylinder 46 is shifted leftward from the position in FIG. 4 to clutch the saw blade 58a of the clutch 58 with the saw blade 52a of the braking female screw cylinder 52 and then to push the clutch 58, which in turn pushes the brake discs 56 whereby a friction force to brake the hub cylinder 62 is produced between the rotary discs 60. Thus, the friction force imposes the braking force on the hub cylinder and in turn on the rear wheel D. Also in this case, because the braking male screw cylinder can not be shifted, the braking female screw cylinder 52 is shifted leftward without any impediment and without running idle because of the presence of the braking spring 68.

As seen from the above, it is readily apparent that the function of the freewheel generally employed in a bicycle is fulfilled by the coaster brake in accordance with the present invention. Namely, when the bicycle goes down a slope, the hub cylinder 62 is rotated with the rear wheel D of the bicycle while the position of the pedal A remains unchanged. Therefore the driving female screw cylinder 64 is shifted axially leftward in FIG. 3 due to the driving spring 70 since the driving change gear 50 is not rotated, resulting in no production of a braking force.

The present invention has been described hereinbefore as being identical with the prior art in that the endless driving and braking chains B and B1 are exclusively used for driving and braking a bicycle respectively in order to perform the driving and braking modes of operation. On the other hand, the present invention has such a different effect from the prior art that the driving female screw cylinder 64 thread-engaged to the driving male screw cylinder 50 to which the driving change gear 50a is fixed is provided to securely clutch and detach the hub cylinder 62, which forms a part of the rear wheel of the bicycle while the clutch spring 66, braking spring 68, and the driving spring 70 are provided to secure the driving and braking modes of operation. Therefore the trouble encountered when the bicycle is pushed backward or in the free-wheel condition can be eliminated due to such a construction, leading to driving and braking functions in a more reliable manner.

It is to be noted that while the present invention has been described with regard to the embodiment employing a disc brake, it is applicable to shoe brake also.

What is claimed is:

1. A multi-speed free-wheel hub with a coaster brake comprising;

an axle;

a brake cylinder rotatably mounted on one end of said axle and having a brake chain sprocket and a thread on its outer surface;

a drive cylinder rotatably mounted in concentric arrangement on said brake cylinder and having a set of speed change sprockets and a thread on its outer surface;

a hub drum rotatably supported on said drive cylinder at one end and on said axle at the other end and having a conical inner surface;

a friction disc brake mechanism located at the other end of said axle and operatively disposed between said axle and said hub drum for braking said hub cylinder against said axle;

a first clutch member rotatable about and axially movable on said axle to move said brake mechanism between a braking position and a release position;

a second clutch member thread fitted on said thread of said brake cylinder and axially movable thereon to engage and disengage with said first clutch member;

a drive cone thread fitted on said drive cylinder and having a conical outer surface friction-engageable with said conical inner surface of said hub drum, said drive cone being concentrically located in surrounding arrangement with respect to said brake cylinder and being axially movable when said drive cylinder rotates to engage and disengage with said hub drum; and spring means attached to said first clutch member and disposed between said second clutch member and said drive cone in a friction contact relationship for transmitting a predetermined circumferential force by friction therebetween.

2. A free-wheel hub as claimed in claim 1, wherein at least one of said conical surfaces on said hub drum and said drive cone is provided with corrugations.

3. A free-wheel hub as claimed in claim 1, wherein said spring means comprises a hollow cylindrical clutch spring placed over said first clutch member at one end and extending between said second clutch member and said drive cone at the other end, a drive spring disposed on said other end of said clutch spring for exerting its spring force against said drive cone, and a brake spring disposed on said other end of said clutch spring for exerting its spring force against said second clutch member.

* * * * *